US011777718B2

(12) United States Patent
Bareket et al.

(10) Patent No.: US 11,777,718 B2
(45) Date of Patent: *Oct. 3, 2023

(54) UNIFICATION OF DATA FLOWS OVER NETWORK LINKS WITH DIFFERENT INTERNET PROTOCOL (IP) ADDRESSES (71) Applicant: Perimeter 81 LTD, Tel-Aviv (IL)

(72) Inventors: Amit Bareket, Tel-Aviv (IL); Sagi Gidali, Rishon-LeZion (IL)

(73) Assignee: Perimeter 81 LTD, Tel-Aviv (IL)

(*) Notice: Subject to any disclaimer, the term of this patent is extended or adjusted under 35 U.S.C. 154(b) by 0 days.

This patent is subject to a terminal disclaimer.

(21) Appl. No.: 18/079,036

(22) Filed: Dec. 12, 2022

(65) Prior Publication Data

US 2023/0106172 A1 Apr. 6, 2023

Related U.S. Application Data (63) Continuation of application No. 16/988,662, filed on Aug. 9, 2020, now Pat. No. 11,558,184.

(51) Int. Cl.
*H04L 9/08* (2006.01)
*H04L 69/164* (2022.01)
*H04L 12/66* (2006.01)

(52) U.S. Cl.
CPC .......... *H04L 9/0838* (2013.01); *H04L 9/0891* (2013.01); *H04L 12/66* (2013.01); *H04L 69/164* (2013.01)

(58) Field of Classification Search
CPC ..... H04L 9/0838; H04L 9/0891; H04L 12/66; H04L 69/164

(Continued)

(56) References Cited

U.S. PATENT DOCUMENTS 8,448,238 B1 ‡ 5/2013 Gupta ................... H04L 67/327
726/15
2006/0248337 A1 ‡ 11/2006 Koodli ................... H04L 63/08
713/153

(Continued)

FOREIGN PATENT DOCUMENTS

WO    WO 2016/089267         6/2016
WO    WO-2016089267 A1 ‡    6/2016  ......... H04L 12/4633

OTHER PUBLICATIONS

Notice of Allowance dated Oct. 3, 2022 from US Patent and Trademark Office Re. U.S. Appl. No. 16/988,662. (5 pages).

(Continued)

*Primary Examiner* — Dereena T Cattungal (57) ABSTRACT

Provided herein are systems, devices and methods for opening a connection in a gateway of a cloud based network for a client device connected via two different network links to the gateway and to a Software Defined Perimeter (SDP) controller of a cloud based network. The SDP controller may receive a request from a client device to connect to a gateway of the cloud based network, generate a one-time SPA key for the client device (after authenticated), transmit the SPA key to the gateway, and transmit, via the first network link, the SPA key to the client device. The client device may transmit the SPA key to the gateway via the second network link and the gateway may be configured to open a connection for the client device via the second network link in case the SPA key is valid.

16 Claims, 4 Drawing Sheets (58) Field of Classification Search
USPC .......................................................... 713/168
See application file for complete search history.

(56) References Cited

U.S. PATENT DOCUMENTS

| | | | |
|---|---|---|---|
| 2007/0198837 A1* | 8/2007 | Koodli | H04W 12/0471 |
| | | | 713/153 |
| 2010/0217837 A1‡ | 8/2010 | Ansari | H04W 12/033 |
| | | | 709/224 |
| 2014/0189810 A1* | 7/2014 | Gupta | H04L 67/63 |
| | | | 726/4 |
| 2018/0241718 A1‡ | 8/2018 | Stair | H04L 63/108 |
| 2020/0007507 A1‡ | 1/2020 | Zhu | H04L 29/06 |
| 2020/0120105 A1* | 4/2020 | Pang | H04L 63/06 |
| 2020/0389437 A1* | 12/2020 | Miller | H04L 63/0236 |
| 2021/0152539 A1* | 5/2021 | Xie | H04L 63/083 |
| 2021/0217837 A1 | 7/2021 | Gu et al. | |
| 2021/0328830 A1‡ | 10/2021 | Kim | H04L 63/10 |
| 2021/0344650 A1‡ | 11/2021 | Kondapavuluru | H04L 63/0272 |
| 2021/0377128 A1* | 12/2021 | Kapadia | H04L 41/0806 |
| 2022/0045854 A1 | 2/2022 | Bareket et al. | |

OTHER PUBLICATIONS

Official Action dated Apr. 1, 2022 from US Patent and Trademark Office Re. U.S. Appl. No. 16/988,662. (9 pages).

\* cited by examiner
‡ imported from a related application

UNIFICATION OF DATA FLOWS OVER NETWORK LINKS WITH DIFFERENT INTERNET PROTOCOL (IP) ADDRESSES

RELATED APPLICATION

This application is a continuation of U.S. patent application Ser. No. 16/988,662 filed on Aug. 9, 2020. The contents of the above application are all incorporated by reference as if fully set forth herein in their entirety.

FIELD AND BACKGROUND OF THE INVENTION

The present invention, in some embodiments thereof, relates to instructing a gateway to open a connection for a client device to connect to cloud based networks, and, more specifically, but not exclusively, to using a Software Defined Perimeter (SDP) controller to instruct a gateway to open a connection for a client device to connect to cloud based networks where the client device is connected to the SDP controller and to the gateway via two different network links using two different IP addresses.

With the rapid and overwhelming growth of cloud based services, platforms and infrastructures, cloud networking is also gaining a constantly growing share in network deployment for a plurality of applications and infrastructures operated by a plurality of companies, organizations, institutions and/or the like.

However, the growing spread of networks and their ever increasing complexity may present major security risks, specifically cyber threats and attacks which may be launched by malicious parties in attempt to compromise networked resources in order to gain access to secure, sensitive, private data and/or gain control over systems, platforms, devices and/or the like.

To mitigate such risks and prevent such cyber-attacks, security measures, for example, firewalls, anti-malware tools and/or the like may be deployed at sensitive network key points to monitor and control network traffic transmitted via the networks.

SUMMARY OF THE INVENTION

According to a first aspect of the present invention there is provided a system for opening a connection in a gateway of a cloud based network for a client device connected via two different network links to the gateway and to a Software Defined Perimeter (SDP) controller, comprising an SDP controller of a cloud based network configured to:
  Receive a request from a client device to connect to a gateway of the cloud based network, wherein the client device is connected to the SDP controller via a first network link using a first Internet Protocol (IP) address and to the gateway via a second network link using a second IP address.
  Generate a one-time Single Packet Authentication (SPA) key for the client device after authenticated. The SPA key having a predefined expiration time.
  Transmit the SPA key to the gateway.
  Transmit, via the first network link, the SPA key to the client device which is configured to transmit the SPA key to the gateway via the second network link. The gateway is configured to open a connection for the client device via the second network link in case the SPA key is valid.

According to a second aspect of the present invention there is provided a computer implemented method of opening a connection in a gateway of a cloud based network for a client device connected via two different network links to the gateway and to an SDP controller comprising using an SDP controller of a cloud based network, the SDP controller is used for:
  Receiving a request from a client device to connect to a gateway of the cloud based network, wherein the client device is connected to the SDP controller via a first network link using a first IP address and to the gateway via a second network link using a second IP address.
  Generating a one-time SPA key for the client device after authenticated. The SPA key having a predefined expiration time.
  Transmitting the SPA key to the gateway.
  Transmitting, via the first network link, the SPA key to the client device which is configured to transmit the SPA key to the gateway via the second network link. The gateway is configured to open a connection for the client device via the second network link in case the SPA key is valid.

According to a third aspect of the present invention there is provided a computer readable medium comprising instructions executable by a computer, which, when executed by the computer, cause the computer to perform a method according to the second aspect.

According to a fourth aspect of the present invention there is provided a client device for connecting to a gateway of a cloud based network via a first network link after authorized by an SDP controller connected via a second network link, comprising one or more processors configured to:
  Transmit a request to an SDP controller of one or more cloud based networks to connect to a gateway of the cloud based network, wherein the client device is connected to the SDP controller via a first network link using a first IP address and to the gateway via a second network link using a second IP address.
  Receive, via the first network link, a one-time SPA key generated by the SDP controller, the SPA key having a predefined expiration time. The SDP controller is configured to transmit the SPA key to the gateway.
  Transmit the SPA key to the gateway via the second network link. The gateway is configured to open a connection for the client device via the second network link in case the SPA key is valid.

According to a fifth aspect of the present invention there is provided a computer implemented method of connecting a client device to a gateway of a cloud based network via a first network link after authorized by a Software Defined Perimeter (SDP) controller connected via a second network link, comprising using one or more processors of a client device for:
  Transmitting a request to an SDP controller of one or more cloud based networks to connect to a gateway of the cloud based network, wherein the client device is connected to the SDP controller via a first network link using a first IP address and to the gateway via a second network link using a second IP address.
  Receiving, via the first network link, a one-time SPA key generated by the SDP controller, the SPA key having a predefined expiration time. The SDP controller is configured to transmit the SPA key to the gateway.
  Transmitting the SPA key to the gateway via the second network link. The gateway is configured to open a connection for the client device via the second network link in case the SPA key is valid.

According to a sixth aspect of the present invention there is provided a computer readable medium comprising instructions executable by a computer, which, when executed by the computer, cause the computer to perform a method according to the fifth aspect.

In a further implementation form of the first, second, third, fourth, fifth and/or sixth aspects, the gateway determines that the SPA key is valid in case the SPA key exists and the expiration time of the SPA key is not expired.

In a further implementation form of the first, second, third, fourth, fifth and/or sixth aspects, the SPA key transmitted by the SDP controller to the client device is encrypted using one or more encryption keys.

In a further implementation form of the first, second, third, fourth, fifth and/or sixth aspects, the client device transmits the SPA key to the gateway according to a door knocking sequence initiated by the client device with the gateway.

In a further implementation form of the first, second, third, fourth, fifth and/or sixth aspects, the client device transmits the SPA key to the gateway in one or more User Datagram Protocol (UDP) packets.

In a further implementation form of the first, second, third, fourth, fifth and/or sixth aspects, the SPA key transmitted by the client device to the gateway is encrypted using one or more encryption keys.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to instructing a gateway to open a connection for a client device to connect to cloud based networks, and, more specifically, but not exclusively, to using a Software Defined Perimeter (SDP) controller to instruct a gateway to open a connection for a client device to connect to cloud based networks where the client device is connected to the SDP controller and to the gateway via two different network links using two different IP addresses.

Access to networks is typically provided by network apparatuses such as gateways which are capable of transferring network traffic between two or more network segments. The gateway may be therefore configured to open connections for one or more network links on one network segment connecting to a first end of the gateway to respective links on one or more other network segments connected to the other end(s) of the gateway.

Users attempting to access one or more of the networks may use client devices, for example, servers, computers, mobile devices (e.g., Smartphone, tablet, etc.), wearable devices (e.g., smart watch, goggles, etc.) and/or the like which have network connectivity and are therefore capable of connecting to one or more of the networks via one or more gateways deployed to provide access to these networks.

Moreover, some of the networks, for example, cloud based networks may be access restricted such that only authorized users may be granted access to resources connected to the restricted networks. One or more Software Defined Perimeter (SDP) controllers may be therefore typically deployed to control the access of the users to the restricted cloud based networks. The SDP controllers are user and/or device centric meaning that the SDP controllers control access of the users to the restricted cloud based networks according to access rights associated with each user. The access rights of each user may define, for example, access rights of the user to one or more networked resources connected to one or more of the restricted cloud based networks, data access privileges (e.g. view, edit, upload, download, etc.) and/or the like.

In such deployments, each client device used by a respective user to access the cloud based network(s) may transmit a connection request to the SDP controller including the access credentials of the respective user. After authenticating the respective user, for example, checking the provided user credentials in one or more users access rights records (e.g. database, etc.), the SDP controller may transmit an open gateway request instructing the gateway of the cloud based network(s) to open a connection for the respective client device. Opening the connection at the gateway as known in the art may include, for example, adjustment and/or re-configuration of the gateway and/or of one or more security measures such as, for example, a firewall and/or the like to enable transfer of network traffic originating from the respective client device to one or more of the cloud based networks and vice versa, from the cloud based network(s) to the client device.

Typically, each client device connects to both the SDP controller and to the gateway via a single network link. In such case, the SDP controller may identify the network address, for example, the IP address of the client device by simply extracting the source address defined in the network packets received from the client device via the network link established between the client device and the SDP controller.

In response to the connection request and assuming the user is successfully authenticated, the SDP controller may instruct the gateway to open a connection for the client device, specifically to open a connection for the network link established between the client device and the gateway which is the same network link connecting the client device to the SDP controller and is thus assigned the same network address, i.e., the same IP address. The gateway may apply the instruction received from the SDP controller and may adjust and/or re-configure, for example, re-configure the firewall to open the connection for the IP address indicated by the SDP controller which is the IP address of the network link established between the client device and both the SDP controller and to the gateway.

However, in some scenarios, due to one or more network operational conditions, features and/or parameters, load balancing, Quality of Service (QoS) and/or the like, the client device may connect to the SDP controller and to the gateway via two different and independent network links, a first network link with the SDP controller and a second network link with the gateway. Each of the two network links may be of course associated with a respective network address, specifically a respective IP address. While it is possible that the two different network links are initiated by the client device, typically the two different network links may be initiated by an access point, for example, a router, a switch, a base station and/or the like which may map a single connection of the client device to two network links connecting to the network(s) where each network link is associated with a different IP address.

In such cases, since the connection links between the client device and the SDP controller on one hand and with the gateway on the other hand are different, the client device practically establishes two separate data flows, one with the SDP controller and a second with the gateway. Due to the two different data flows, the SDP controller which is not aware of the operational parameters of the second network link, specifically the second IP address, may be no longer able to correctly instruct the gateway to adjust and/or re-configure in order to open the connection for the client device to access the cloud based network(s).

According to some embodiments of the present invention, there are provided methods, systems, devices and computer program products for unifying the two data flows by adapting the SDP controller to instruct the gateway to open a connection for the client device to access one or more of the cloud based networks for client devices which are connected to the SDP controller and to the gateway via two separate network links associated with different IP addresses. In particular, opening the connection at the gateway is done by applying one or more port knocking protocols as known in the art, for example, Single Packet Authorization (SPA) and/or the like.

In response to the connection request received from the client device, the SDP controller may first authenticate the user based on the credentials extracted from the connection request received from the client device and in case the user is successfully authenticated and determined to have access rights to one or more of the cloud based networks, the SDP controller may generate an access key, for example, an SPA key for use by the client device to access the gateway. In particular, the SDP controller may create the SPA key as a one-time key having a predefined expiration period such that when the expiration time ends, the SPA key is no longer valid.

The SDP controller may then transmit the open gateway request to the gateway and may further provide the one-time SPA key to the gateway, for example, transmit the SPA key to the gateway, store the SPA key in one or more access keys repositories accessible to the gateway and/or the like.

The SDP controller may also transmit the one-time SPA key to the client device. Optionally, the SDP controller encrypts the SPA key transmitted to the client device using one or more encryption keys, algorithms and/or protocols which may be predefined and/or negotiated between the client device and the gateway, for example, a symmetric encryption/decryption key, an asymmetric (public/private) key and/or the like.

When attempting to connect to the gateway via the second network link associated with the second IP address in order to access one or more of the cloud based, the client device may transmit the one-time SPA key to the gateway according to one or more of the door knocking protocols. The client device may transmit the SPA key in one or more packets constructed, encapsulated and/or transmitted according to one or more network communication protocols, for example, a User Datagram Protocols (UDP) packet.

Optionally, the client device encrypts the SPA key transmitted to the gateway using one or more of the encryption keys, algorithms and/or protocols which may be predefined and/or negotiated between the client device and the gateway.

The gateway which is configured to monitor the network ports for door knocking sequences may analyze the one-time SPA key received from the client device to verify it is a valid SPA key. To this end, the gateway may analyze the one-time SPA key received from the client device compared to the one-time SPA key generated for the client device by the SDP controller, for example, a respective SPA key received from the SDP controller and/or retrieved from one or more of the access keys repositories. In addition, the gateway may verify that the SPA key received from the client device is not expired, i.e. that the expiration time of the Spa key is not due and the SPA key is thus valid.

In case the gateway determines that the SPA key received from the client device is valid, the gateway may open the connection for the client device via the second network link and enable the client device to access one or more of the cloud based networks.

Unifying the two data flows created by the two different network links connecting the client device to the SDP controller via a first network link and to the gateway via a second network link may present major benefits and advantages compared to existing systems and methods for authenticating users and authoring access for client devices to restricted networked resources.

First, using legacy SDP controller as may be done by the existing methods may break the data flow since such SDP controller are typically configured to instruct the gateway to open the connection for the IP address of the client device as identified by the SDP controller which is different from the IP address used by the client device to connect to the gateway. This limitation is overcome by unifying the two separate data floes since the SDP controller is adjusted to instruct the gateway to open the connection for the second IP address used by the client device to communicate via the second network link established with the gateway based on the SPA key verification rather than based on the IP address identified by the SDP controller which is obviously different from IP address identified by the gateway.

Moreover, creating the SPA key which is used by the client device to authenticate itself to the gateway may significantly increase security of the gateway and hence of the restricted cloud based networks prevent since the gateway may provide access to the cloud based networks only to client devices which are determined by the gateway, based on their SPA keys, to be authenticated and authorized by the SDP controller to access the restricted cloud based networks.

Furthermore, configuring the SPA key to be a one-time access key may further increase security of the gateway and of the restricted cloud based networks since the SPA keys expire after the predefined time period thus preventing a malicious party from launching a replay attack and fraudulently use one or more previously generated SPA keys in attempt to deceive the gateway and gain access one or more of the cloud based networks.

In addition, encrypting the SPA key transmitted by the SDP controller to the client device and/or the SPA key transmitted by the client device to the gateway may also increase security of the gateway and of the restricted cloud based networks since the encryption may prevent interception of one or more of the SPA keys by a malicious party.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
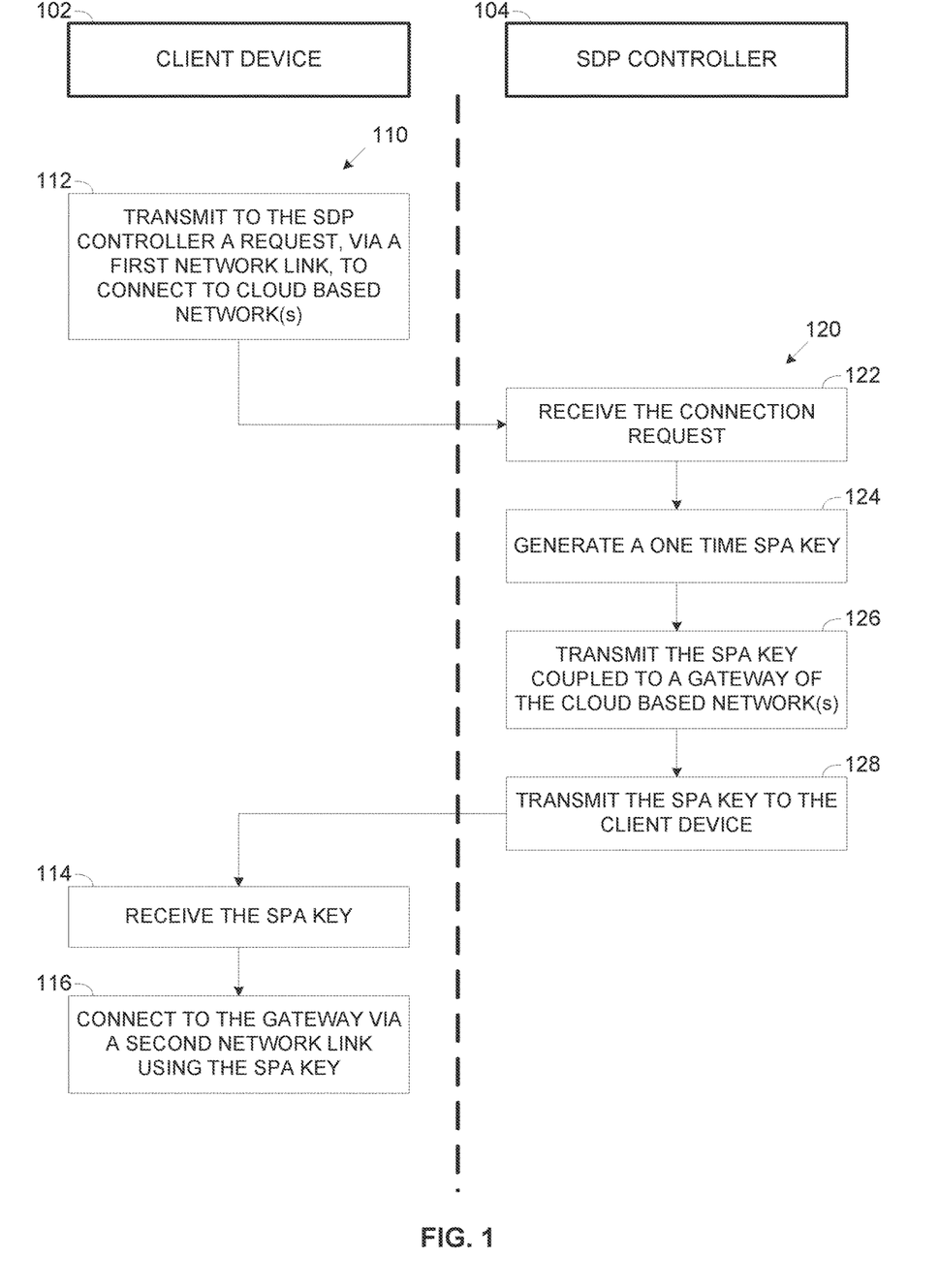
FIG. 1 illustrates flowcharts of exemplary processes conducted by a client device and an SDP controller for opening a gateway connection for the client device which is connected the SDP controller and to the gateway via two different network links, according to some embodiments of the present invention.

Referring now to the drawings, FIG. 1 illustrates flowcharts of exemplary processes conducted by a client device and an SDP controller for opening a gateway connection for the client device which is connected the SDP controller and to the gateway via two different network links, according to some embodiments of the present invention.

An exemplary process 110 may be executed by a client device 102 used by a respective user for accessing one or more cloud based networks via a gateway. A complementary exemplary process 120 may be executed by an SDP controller 104 deployed to control access of the user to the cloud based network(s) by controlling the gateway to open a connection for the client device to connect one or more of the cloud based networks.

Figure 2:
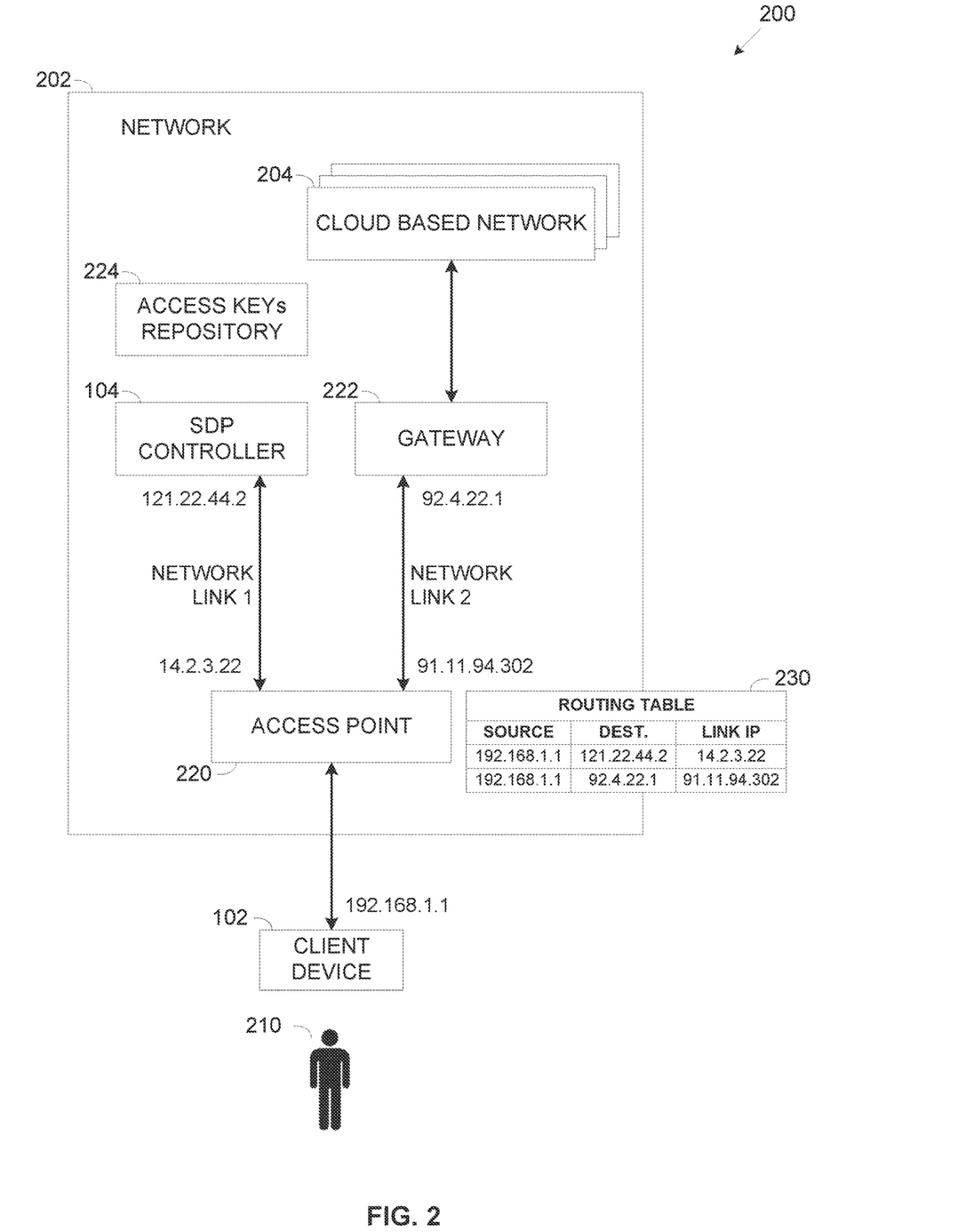
FIG. 2 is a schematic illustration of an exemplary system for opening a gateway connection by an SDP controller for a client device connected the SDP controller and to the gateway via two different network links, according to some embodiments of the present invention.

Reference is also made to FIG. 2, which is a schematic illustration of an exemplary system for opening a gateway connection by an SDP controller for a client device connected the SDP controller and to the gateway via two different network links, according to some embodiments of the present invention.

An exemplary system 200 may a client device such as the client device 102 used by a user 210 for accessing a network 202 comprising one or more wired and/or wireless networks, for example, a Local Area Network (LAN), a Wireless LAN (WLAN), a Wide Area Network (WAN), a Municipal Area Network (MAN), a cellular network, the internet and/or the like.

Moreover, the network 202 may comprise one or more cloud based networks 204 which may be accessed by the user 210 using the client device 102. The cloud based networks 204 are optionally utilized using one or more cloud services, platforms and/or infrastructures, for example, NaaS. Moreover, the cloud based networks 204 may be configured to support multi-tenancy by configuring one or more of the cloud based networks 204 as private virtual networks which are segregated, separated and isolated from the other cloud based virtual networks 204.

The client device 102, for example, a server, a computer, a mobile device (e.g., Smartphone, tablet, etc.), a wearable device (e.g., smart watch, goggles, etc.) may include a network interface for connecting to the network 202, specifically to the one or more of the cloud based networks 204. The client device 102 may further include one or more processors capable of executing one or more software modules such as, for example, a process, a script, an application, an agent, a utility, a tool, an Operating System (OS) and/or the like each comprising a plurality of program instructions stored in a non-transitory medium (program store) of the respective client device 204. One or more of the client devices 204 may optionally include, utilize and/or otherwise facilitate one or more hardware modules (elements), for example, a circuit, a component, an IC, an Application Specific Integrated Circuit (ASIC), a Field Programmable Gate Array (FPGA), a Digital Signals Processor (DSP), a Graphic Processing Units (GPU) and/or the like. The client device 204 may therefore execute one or more functional modules utilized by one or more software modules, one or more of the hardware modules and/or a combination thereof. In particular, each of the client devices 204 may execute one or more functional modules to execute the process 110 for accessing one or more of the cloud based networks 204. For example, the client device 102 may execute one or more software modules i.e. computer program comprising program code for executing the process 110.

The SDP controller 104 may be deployed in the network 202 to control access of the client device 102 to the network 202, specifically to one or more of the cloud based networks 204. The SDP controller 104 is configured, as known in the art, to control access to protected resources, specifically to the cloud based networks 204 based on identity of the accessing users 210. The SDP controller 104 may receive one or more connection requests from the client device 102 which may typically include credentials of the user 210 attempting to access the cloud based network(s) 204, for example, an identity of the respective user such as, for example, a name, a user name, an account name, an account number and/or the like, a secret access code, for example, a password, a code and/or the like. The SDP controller 104 may analyze the credentials to determine whether the user 210 has access rights to of the cloud based network(s) 204 and what type of access rights. The SDP controller 104 may further store and maintain one or more user account records, for example, a table, a file, a database and/or the like which correlate the user 210, specifically the credentials of the user 210 with the respective access rights authorized for the user 210.

In case the user 210 is authorized to access one or more of the cloud based networks 204, the SDP controller 210 may instruct a gateway 222 to provide access to the cloud based virtual networks 204 for the client device 102 connecting to the gateways 212 via one or more of the wired and/or wireless networks.

The gateway 222 may be deployed an edge server connected at an edge of the network 202 in close network proximity to an access point 220, for example, a router, a switch, a base station and/or the like providing network connectivity to the client devices 102. The access point 220 bridging between a local network hosting the client device 102 and the network 202 may create a network link connecting the client device 102 to one or more network resources connected to the network 202, for example, the SDP controller, the gateway 222 and/or the like. The network link created for the client device 102 may be assigned a network address, specifically an IP address which is associated with the client device 102 and is referred to hereinafter as the IP address of the client device 102.

Close network proximity may be defined as a minimal number of network Hops in which network traffic packets are passed from one network segment to another, i.e. the packets go through another network infrastructure element such as, for example, a router, a switch, a gateway and/or the like.

The SDP controller 104 may be implemented using one or more physical computing nodes, for example, a server, a computer and/or the like each having one or more processors and optionally one or more supporting hardware modules and thus capable of executing one or more functional modules utilized by one or more software modules, one or more of the hardware modules and/or a combination thereof. In particular, the SDP controller 104 may execute a process such as the process 120 for controlling access of the client device 102 to one or more of the cloud based networks 204. However, the SDP controller 104 may be implemented using one or more virtual machines (VM) instantiated using resources, for example, computing resources, storage resources, networking resources and/or the like provided by one or more physical computing nodes and/or by one or more of the cloud platforms, services and/or applications. The SDP controller 104 may therefore execute one or more software modules i.e. computer program comprising program code, optionally supported by one or more hardware modules for executing the process 120. The gateway 222 may be also implemented using physical computing nodes and/or one or more VMs.

The client devices 102 operated by the user 210 may optionally connect to the gateway 222 via a secure link, for example, a Virtual Private Network (VPN) link and/or the like to ensure security and privacy of the data exchanged between the client device 102 and the gateways 222. To establish the VPN link, each client device 102 may transmit the credentials of the user 210 to the SDP controller 104 which may analyze the received credentials with respect to the user access rights record(s) and may instruct the gateway 222 to open a connection for the VPN link of the client device 102 according to the access rights of the user 210 retrieved from the user access rights record(s).

Typically, the client device 102 may connect to the SDP controller 104 and to the gateway 222 via a single network link. In such cases, the SDP controller 104 may identify the network address, for example, the IP address of the client device 102 which is the source address in the packets received from the client device 102 over the network link established between the client device 102 and the SDP controller 104. The SDP controller 104 may therefore instruct the gateway 222 to open a connection for the client device 102, specifically for a network link connecting the client device 102 to the gateway 222 which is the same network link connecting the client device 102 to the SDP controller 104 using the same IP address of the client device 102. Opening the connection for the client device 102 at the gateway 222 may require adjustment, and/or re-configuration relating to the gateway 222, for example, enabling one or more security measures deployed to protect network traffic through the gateway 222, for example, a firewall and/or the like. The adjustment and/or re-configuration may include, for example, opening a port, opening a link, opening a socket and/or the like in the firewall.

Figure 3:
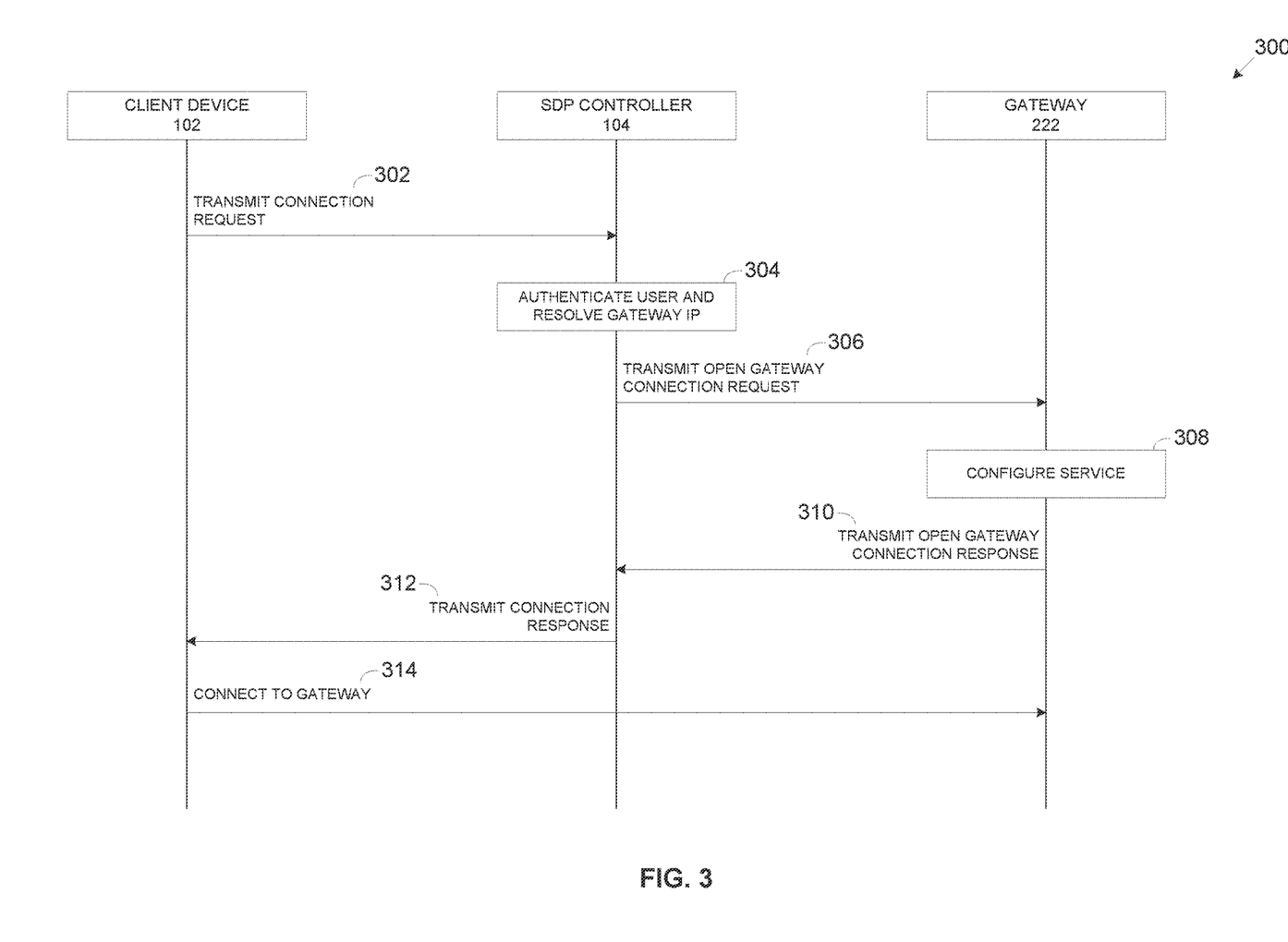
FIG. 3 is a schematic illustration of an exemplary flow for opening a gateway connection by an SDP controller for a client device.

Reference is now made to FIG. 3, which is a schematic illustration of an exemplary flow for opening a gateway connection by an SDP controller for a client device. An exemplary flow 300 may be followed by a client device such as the client device 102, an SDP controller such as the SDP controller 104 and a gateway such as the gateway 222 to open a connection for the client device 102 at the gateway 222 after the client device 102 is authenticated by the SDP controller 104.

As shown at 302, the client device 102 which is connected to a network such as the network 202 via an access point such as the access point 220 may establish a network link with the SDP controller 104 and may transmit a connection request to the SDP controller 104. The connection request as known in the art may include information such as, for example, a network identification (ID) of the client device 102, a service type and/or the like.

Optionally, the network link created for the client device 102 may be secure, for example, a VPN link using one or more encryption, and/or encapsulation algorithms, protocols, tools and/or the like, for example, WireGuard and/or the like. In such case, the connection request originating from the client device 102 may further include a public key (e.g. wg_client_public_key) which is part of a key pair uniquely associated with the user 210 comprising a private key known only to the user 210 and the public which is publicly distributed. The public key may be used by one or more destination network nodes, for example, the SDP controller 104, the gateway 222 and/or the like to decrypt and optionally authenticate network packets received from the client device 102 via the secure network link.

The connection request may further include the credentials of a user such as the user 210 using the client device 102 to access one or more cloud based networks such as the cloud based networks 204.

As shown at 304, in response to the connection request, the SDP controller 104 may first authenticate the user 210 by verifying the received credentials compared to the user account records storing the credentials of the user 210 correlated with the access rights authorized for the user 210. The SDP controller 104 may resolve the network address, i.e. the IP address of the gateway 222 suitable for serving the connection request received from the client device 102 and may further identify a suitable gateway peer.

As shown at 306, the SDP controller 104 may transmit an open gateway connection request to the gateway 222 instructing the gateway 222 to open a connection for the client device 102, specifically for a network link which uses the network address, for example, the IP address allocated for the client device 2102, for example, by the access point 220. Since the client device 102 connects to both the SDP controller 104 and to the getaway 222 via the same network link using the same IP address, the gateway 222 may be configured to open a connection for the same network link (using the same IP address) established by the client device 102 with the SDP controller 104. The SDP controller 104 may therefore simply extract the IP address of the client device 102 from packets received from the client device 102 and may include the extracted IP address in the open gateway connection request transmitted to the gateway 222. The open gateway connection request may further include at least some of the information extracted from the connection request received from the client device 102.

As shown at 308, the gateway 222 may configure itself to provide the connection and the service requested indicated by the open gateway connection request received from the SDP controller 104.

As shown at 310, the gateway 222 may transmit to the SDP controller 104 an open gateway connection response indicating that the requested connection is configured in the gateway 222. The response transmitted by the gateway 222 may include information as known in the art which may be required for the client device 102 to connect to the gateway 222, for example, the network ID of the client device 102, the service type, the network (IP) address of the client device 102, the network (IP) address of the gateway 222, status information and/or the like. In case the client device 102 establishes the secure connection over the network link, for example, the VPN (e.g., WireGuard), the response transmitted by the gateway 222 may include further information relating to the secure connection, for example, the public key of the client device 102, the network (IP) address(es) allowed (open) at the gateway 222, the public key of the gateway 222, information relating to an access key base and/or the like.

As shown at 312, the SDP controller 104 may transmit an open connection response indicating that the requested connection is configured in the gateway 222. The open connection response transmitted to the client device 102 by the SDP controller 104 may include the information extracted from the response transmitted by the gateway 222 and/or part thereof.

As shown at 314, the client device 102 may connect to one or more of the cloud based networks 204 via the connection configured for the client device 102 at the gateway 222.

Reference is made once again to FIG. 2.

In some scenarios, due to one or more network operational conditions, features and/or parameters, the client device 102 may connect to the SDP controller 104 and to the gateway 222 via two different independent network links each associated with a respective different source network address, for example, an IP address. While it is possible that the two different network links are created and established by the client device 102 itself, for example, a server comprising multiple network interfaces supporting independent network links, typically the two different network links may be created and established by the access point 220 connecting the client device 102 to the network 202. The network operational conditions, features and/or parameters which may cause the access point 220 to create the two independent network links for the single (same) client device 102 may include, for example, load balancing, Quality of Service (QoS) and/or the like.

For example, the client device 102 assigned with a network address, specifically an IP address 192.168.1.1 may connect to the network 202, specifically to the SDP controller 104 and to the gateway 222 via the access point 220. The access point 220 may establish a first network link (network link 1) associated with IP address 14.2.3.22 to connect the client device 102 to the SDP controller 104 associated with the IP address 121.22.44.2 and a second network link (network link 2) associated with IP address 91.11.94.302 to connect the client device 102 to the gateway 222 associated with IP address 9.4.22.1. The access point 220 may update its routing table 230 accordingly as known in the art to map both network links 1 and 2 to the client device 102.

In such cases, since the connection links between the client device 102 and the SDP controller 104 on one hand and with the gateway 222 on the other hand are different, the flow 300 may be broken. This is because the client device 102 is connected to the SDP controller 104 via the first network link which is different from the second network link connecting the client device 102 to the gateway 222, the SDP controller 104 may be unable to identify the network address, i.e., the IP address associated with the first network link and may be thus unable to instruct the gateway 222 to open the connection for the client device 102 via the second network link associated with the second IP address.

The present invention presents one or more embodiments to overcome the separate network links limitation using one or more port knocking protocols, algorithms and/or techniques as described herein after in detail, for example, SPA keys and/or the like.

One or more access keys repositories 224 may be therefore deployed for storing the SPA keys which may be generated by one or more SDP controller such as the SDP controller 104 for one or more client devices such as the client device 102 and may be retrieved by one or more gateways such as the gateway 222 which may use the access keys to validate each client device 102 connecting to the getaway 222 via a second network link which is different from the first network link connecting the client device 102 to the SDP controller 104.

Reference is made once again to FIG. 1 and FIG. 2.

The system 200 and the processes 110 and 120 are presented with a single SDP controller 104 executing the process 130 for controlling a single gateway 222 to open a connection for a single client device 102 connecting to one or more of the cloud based networks 204. This however, should not be construed as limiting, since the system 200 may be expanded to include one or more SDP controllers such as the SDP controller each executing a process such as the process 120 to control access of a plurality of client devices such as the client device 102 by configuring accordingly one or more gateways such as the gateway 222.

The processes 110 and 120 which are executed by the client device 102 and the SDP controller 104 respectively are interlinked to and interact with each other. The processes 110 and 120 are therefore described in conjunction with each other according to the operational and functional sequence of the overall process of opening at the gateway 222 a network connection for the client device 102 for connecting to one or more of the cloud based networks 204.

The process 120 may be conducted by the SDP controller 104 to generate for the client device 102 a one-time SPA key having a predefined expiration period and transmit the one-time SPA key to the client device 102 as well as to the gateway 222. The client device 102 may then access the gateway 222 and transmit the SPA key to the gateway which may validate the SPA key and open a connection for the client device 102 in case the SPA key is valid.

As shown at 112, the client device 102 may transmit a connection request to the SDP controller 104 for connecting to one or more of the cloud based networks 204 via the gateway 222. As describe herein before, the connection request may include the network ID of the client device 102, the requested service type and/or the like.

However, as described herein before, the client device 102 may be connected to the SDP controller 104 and to the gateway 212 via two different and separate network links, for example, allocated by the access point 220, a first network link using a first IP address for connecting to the SDP controller 104 and a second network link using a second IP address for connecting to the gateway 222. The connection request may further include the credentials provided by the user 210 using the client device 102 to access one or more of the cloud based networks 204, for example, a name, a user name, an account name, an account number and/or the like, a secret access code, for example, a password, a code and/or the like.

Optionally, in case the network link created for the client device 102 is secure, for example, a VPN link such as, for example, WireGuard, the connection request originating from the client device 102 may further include the public key (e.g., wg_client_public_key) of the user 210.

As shown at 122, the SDP controller 104 may receive the connection request transmitted by the client device 102. The SDP controller 104 may analyze the credentials of the user 210 with respect to the user account record(s) to authenticate the user 210 and determine his access rights and privileges to one or more of the cloud based networks 204. The As shown at 124, the SDP controller 104 may create a one-time access key, for example, a one-time SPA key for the client device 102. In particular, the SDP controller 104 may create the one-time SPA key in case the client device 102 is successfully authenticated based on his credentials and access rights.

The SDP controller 104 may create the one-time SPA key to have a predefined expiration time such that each SPA key is valid for only the predefined time period.

As shown at 126, the SDP controller 104 may transmit an open gateway connection request to the gateway 222 instructing the gateway 222 to open a connection for the client device 102 after the client device 102 is successfully verified using one or more door knocking protocols. The open gateway connection request may include at least some of the information extracted from the connection request received from the client device 102.

The SDP controller 104 may first resolve the network address, i.e. the IP address of the gateway 222 suitable for serving the connection request received from the client device 102 and may further identify a suitable gateway peer. Specifically, SDP controller 104 may resolve the IP address and peer of the gateway 222 which are suitable for serving the client device 102.

As described herein before, via the open gateway connection request, the SDP controller 104 may instruct the gateway 222 and/or one or more security measures deployed to protect network traffic through the gateway 222 to adjust and/or re-configure in order to open the connection for the client device 102. Such adjustment, and/or re-configuration may include, for example, opening a port, opening a link, opening a socket and/or the like in the firewall. The gateway 222 may thus adjust and/or re-configure according to the open gateway connection request.

The SDP controller 104 may further provide the gateway 22 with the one-time SPA key generated for the client device 102. For example, the SDP controller 104 may transmit the one-time SPA key to the gateway 222, optionally within and/or associated with the open gateway request. In another example, the SDP controller 104 may update one or more of the access keys repositories 224 to include the one-time SPA key generated for the client device 102 correlated with the IP address of the client device 102, specifically the second IP addressed used by the client device 102 to connect via the second network link to the gateway 222. Optionally, the access keys repositories 224 may be implemented using one or more Distributed Lock Managers (DLM) as known in the art, for example, Redis and/or the like which may store the SPA access keys and may control a Time to Live (TTL) of each of the one-time SPA keys. As such the DLM may associate monitor the expiration time of each SPA key generated by the SDP controller 104 for the client device 102.

As shown at 128, the SDP controller 104 may transmit the SPA key to the client device 102. Optionally, the SDP controller 104 encrypts the SPA key transmitted to the client device 102 using one or more encryption keys, algorithms and/or protocols which may be predefined and/or negotiated between the SDP controller 104 and the client device 102, for example, a symmetric encryption/decryption key, an asymmetric (public/private) key and/or the like.

As shown at 114, the client device 102 may receive the SPA key.

As shown at 116, the client device 102 may transmit the one-time SPA key to the gateway 222 via the second network link using the second IP address. Specifically, the client device 102 may transmit the one-time SPA key to the gateway 222 as part of a door knocking sequence applied by the client device 102 according to one or more of the door knocking protocols as known in the art.

The client device 102 may transmit the SPA key in one or more packets constructed, encapsulated and/or transmitted according to one or more network communication protocols. For example, the client device 102 may transmit the SPA key to the gateway 222 in one or more User Datagram Protocols (UDP) packets.

Optionally, the client device 102 encrypts the SPA key transmitted to the gateway 222 using one or more of the encryption keys, algorithms and/or protocols which may be predefined and/or negotiated between the client device 102 and the gateway 222.

The gateway 222, configured to detect and monitor one or more door knocking sequences, may identify the door knocking sequence and may analyze the one-time SPA key received from the client device 102 compared to a respective SPA key received from the SDP controller 104 and/or retrieved from one or more of the access keys repositories 224 to determine whether the SPA key provided by the client device 102 is valid. In particular, the gateway 222 may check that the provided SPA key exists and that it is not expired, i.e. that the expiration time is not due and the SPA key is thus valid. Generating the SPA key as a one-time key may prevent one or more malicious parties from fraudulently using a previously generated SPA key in attempt to deceive the gateway 222 and gain access one or more of the cloud based networks 204.

In case the gateway 222 determines that the SPA key received from the client device 102 is valid, the gateway 222 may open the connection for the client device 102 thus enabling the client device 102 access to one or more of the cloud based networks 204. In particular, the gateway 222 may adjust and/or re-configure to Reference is now made to FIG. 4, which is a schematic illustration of an exemplary flow for opening a gateway connection by an SDP controller for a client device connected the SDP controller and to the gateway via two different network links, according to some embodiments of the present invention. An exemplary flow 400 may be followed by a client device such as the client device 102 connected to an SDP controller such as the SDP controller 104 via a first network link using a first network (IP) address and a gateway such as the gateway 222 to open a connection for the client device 102 connected to the gateway 222 via a second network link using a second network (IP) address.

Figure 4:
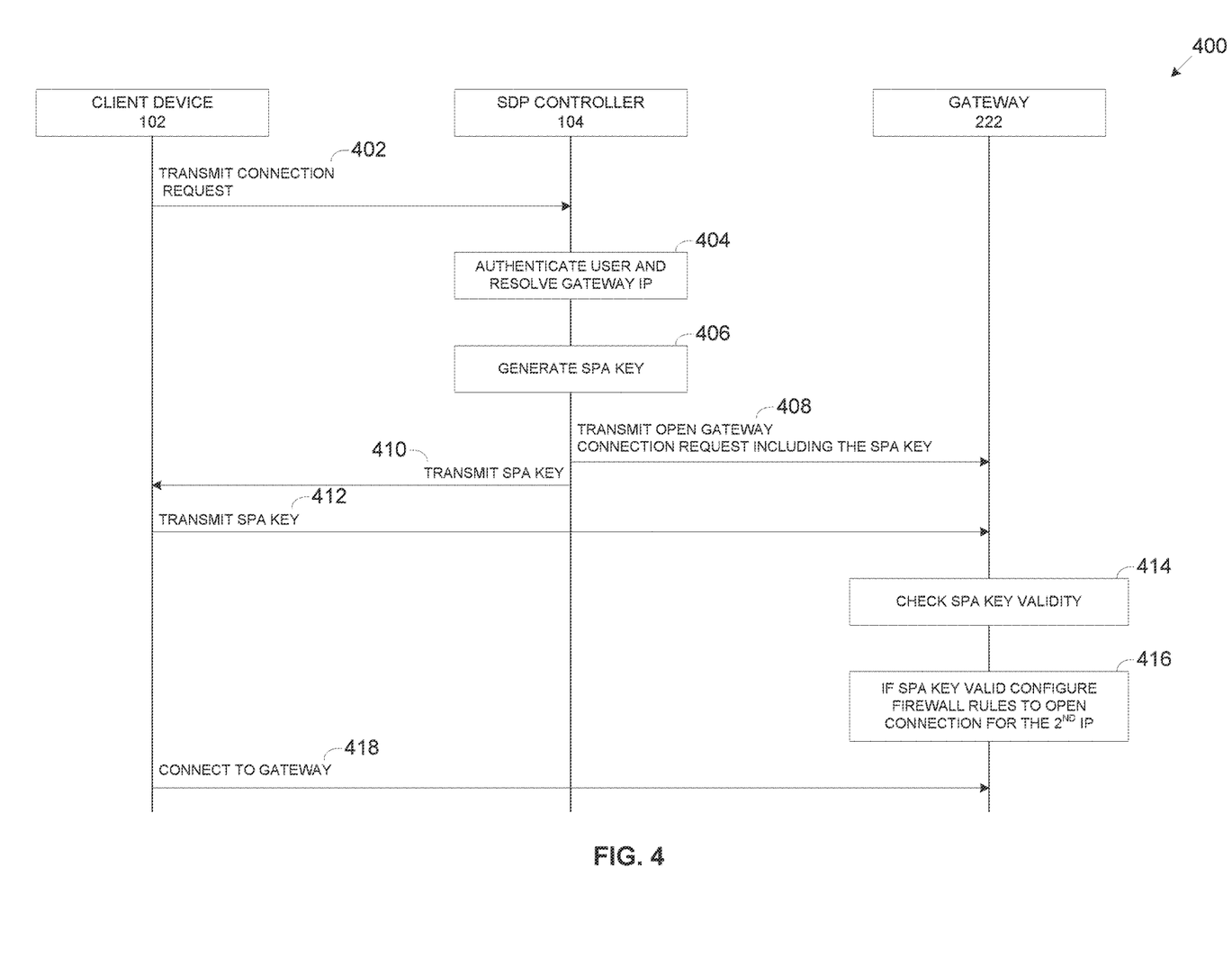
FIG. 4 is a schematic illustration of an exemplary flow for opening a gateway connection by an SDP controller for a client device connected the SDP controller and to the gateway via two different network links, according to some embodiments of the present invention.

As shown at 402, the client device 102 which is connected to a network such as the network 202 via an access point such as the access point 220 may establish a first network link with the SDP controller 104 and may transmit to the SDP controller 104 a connection request for connecting to one or more of the cloud based networks 204 via the gateway 222. As described herein before, the connection request may include information such as, for example, a network identification (ID) of the client device 102, a service type and/or the like. however, since the client device 102

Optionally, in case the connection over the first and/or second network links is a secure connection, for example, the VPN link and/or the like, the connection request transmitted by the client device 102 may further include the public key (e.g. wg_client_public_key) associated with the user 210 using the client device 102 which may be used by one or more destination network nodes, for example, the SDP controller 104, the gateway 222 and/or the like to decrypt and optionally authenticate network packets received from the client device 102.

The connection request may further include the credentials of a user such as the user 210 using the client device 102 to access one or more cloud based networks such as the cloud based networks 204.

As shown at 404, in response to the connection request, the SDP controller 104 may first authenticate the user 210 by verifying the received credentials compared to the user account records storing the credentials of the user 210 correlated with the access rights authorized for the user 210.

As shown at 406, the SDP controller 104 may generate a one-time SPA key for the client device 102 having the predefined expiration time as described in step 124 of the process 120.

As shown at 408, the SDP controller 104 may transmit an open gateway connection request to the gateway 222 as described in step 126 of the process 120 instructing the gateway 22 to open a connection for the client device 102, specifically for the client device 102 authenticated through a door knocking sequence using the SPA key.

As described in step 126 of the process 120, the SDP controller 104 may further resolve the network address, i.e. the IP address of the gateway 222 suitable for serving the connection request received from the client device 102, and may further identify a suitable gateway peer.

As shown at 410, the SDP controller 104 may transmit the one-time SPA key to the client device 102.

As shown at 412, as part of the door knocking sequence, the client device 102 may transmit the one-time SPA key to the gateway 222 via the second network link using the second IP address. As described in step 116 of the process 110, the client device 102 may transmit the SPA key in one or more packets constructed, encapsulated and/or transmitted according to one or more of the network protocols, for example, a UDP packet. Optionally, as described in step 116 of the process 110, the client device 102 may encrypt the SPA key transmitted to the gateway 222 using one or more of the encryption keys, algorithms and/or protocols predefined and/or negotiated between the client device 102 and the gateway 222.

As shown at 414, the gateway 222 may detect the door knocking sequence initiated by the client device 102 and may analyze the one-time SPA key received from the client device 102 compared to the access keys stored and/or managed by one or more of the access keys repositories 224 to determine whether the SPA key provided by the client device 102 is valid. As described in step 116 of the process 110, the gateway 222 may check the provided SPA key to verify that the SPA key exists and that the expiration time of the SPA key is not expired (due).

As seen at 416, in case the gateway 222 determines that the SPA key provided by the client device 102 is valid, the gateway 222 may open the connection for the client device 102 by adjusting and/or re-configuring one or more of the security measures, for example, the firewall to open a connection for the client device 102 via the second network link using the second IP address.

As seen at 418, after the connection is opened and enabled, the client device 102 may access one or more of the cloud based networks 204 via the gateway 222.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms network addresses, port knocking protocols, access keys repositories are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for opening connections in a gateway of a cloud based network for client devices connected via two different network links to the gateway and to a Software Defined Perimeter (SDP) controller, comprising: an SDP controller of at least one cloud based network configured to: receive, by the SDP controller, at least one connection request from at least one client device to connect to a gateway of the at least one cloud based network, the at least one client device is connected to the SDP controller via a first network link using a first Internet Protocol (IP) address and to the gateway via a second network link using a second IP address; generate, by the SDP controller, at least one one-time Single Packet Authentication (SPA) key for the at least one client device after authenticated, the at least one one-time SPA key having a predefined expiration time; and store, by the SDP controller, the at least one one-time SPA key in at least one access keys repository accessible to the gateway; wherein the gateway is configured to retrieve the at least one one-time SPA key from the at least one access keys repository and open at least one connection for the at least one client device via the second network link based on validation of at least one one-time SPA key received from the at least one client device compared to the retrieved at least one one-time SPA key; wherein the at least one one-time SPA key is transmitted by the SDP controller to the at least one client device via the first network link.

2. The system of claim 1, wherein the at least one access keys repository is configured to monitor a time to live (TTL) of the at least one one-time SPA key and control the expiration time accordingly.

3. The system of claim 1, wherein the gateway is further configured to determine that the at least one one-time SPA key is valid by verifying that the expiration time of the at least one one-time SPA key is not expired.

4. The system of claim 1, wherein at least one of the first network link and the second network link is a secure link.

5. The system of claim 1, wherein the first network link and the second network link are mapped by a an access point providing network connectivity to the at least one client device.

6. The system of claim 1, wherein the at least one one-time SPA key transmitted by the SDP controller to the at least one client device is encrypted using at least one encryption key.

7. The system of claim 1, wherein the at least one client device transmits the at least one one-time SPA key to the gateway according to a door knocking sequence initiated by the at least one client device with the gateway.

8. The system of claim 1, wherein the at least one client device transmits the at least one one-time SPA key to the gateway in at least one User Datagram Protocol (UDP) packet.

9. The system of claim 1, wherein the at least one one-time SPA key transmitted by the at least one client device to the gateway is encrypted using at least one encryption key.

10. The system of claim 1, wherein the connection request further includes a public key of a key pair uniquely associated with at least one user of the at least one client device, the SDP is configured to transmit the public to the gateway which may be configured to authenticate at least one packet network packet transmitted by the at least one client device and signed with a corresponding private key of the key pair.

11. The system of claim 1, wherein the SDP controller is configured to generate the at least one one-time SPA key for the at least one client device after successfully authenticating at least one user of the at least one client device based on credentials of the at least one user extracted from the at least one connection request.

12. A computer implemented method of opening connections in a gateway of a cloud based network for client devices connected via two different network links to the gateway and to a Software Defined Perimeter (SDP) controller comprising: using an SDP controller of a cloud based network, the SDP controller is used for: receiving, by the SDP controller, at least one connection request from at least one client device to connect to a gateway of the cloud based network, the at least one client device is connected to the SDP controller via a first network link using a first Internet Protocol (IP) address and to the gateway via a second network link using a second IP address; generating, by the SDP controller, at least one one-time Single Packet Authentication (SPA) key for the at least one client device after authenticated, the at least one one-time SPA key having a predefined expiration time; and storing, by the SDP controller, the at least one one-time SPA key in at least one access keys repository accessible to a gateway; wherein the gateway is configured to retrieve the at least one one-time SPA key from the at least one access keys repository and open at least one connection for the at least one client device via the second network link based on validation of at least one one-time SPA key received from the at least one client device compared to the retrieved at least one one-time SPA key; wherein the at least one one-time SPA key is transmitted by the SDP controller to the at least one client device via the first network link.

13. A computer program product comprising program code for performing a method according to claim 12, when the computer program runs on a computing device.

14. A gateway for connecting client devices to a cloud based network via a first network link after authorized by a Software Defined Perimeter (SDP) controller connected via a second network link, comprising: a gateway of at least one cloud based network, the gateway is configured to: access, by the gateway, at least one access keys repository to retrieve at least one one-time Single Packet Authentication (SPA) key generated by an SDP controller of at least one cloud based network for at least one client device connected to the SDP controller via a first network link using a first Internet Protocol (IP) address, the at least one one-time SPA key having a predefined expiration time is transmitted by the SDP controller to the at least one client device; receive, by the gateway, the at least one one-time SPA key from the at least one client device, the at least one client device is connected to the gateway via a second network link using a second IP address; validate, by the gateway, the at least one one-time SPA key received from the at least one client device compared to the retrieved at least one one-time SPA key; and open, by the gateway, a connection for the at least one client device via the second network link in case the at least one one-time SPA key is valid key; wherein the at least one one-time SPA key is transmitted by the SDP controller to the at least one client device via the first network link.

15. A computer implemented method of connecting client devices to a gateway of a cloud based network via a first network link after authorized by a Software Defined Perimeter (SDP) controller connected via a second network link, comprising: using a gateway of at least one cloud based network for: accessing, by the gateway, at least one access keys repository to retrieve at least one one-time Single Packet Authentication (SPA) key generated by an SDP controller of the at least one cloud based network for at least one client device connected to the SDP controller via a first network link using a first Internet Protocol (IP) address, the at least one one-time SPA key having a predefined expiration time is transmitted by the SDP controller to the at least one client device; receiving, by the gateway, the at least one one-time SPA key from the at least one client device, the at least one client device is connected to the gateway via a second network link using a second IP address; validating, by the gateway, the at least one one-time SPA key received from the client device compared to the retrieved at least one one-time SPA key; and opening, by the gateway, a connection for the at least one client device via the second network link in case the one-time SPA key is valid; wherein the at least one one-time SPA key is transmitted by the SDP controller to the at least one client device via the first network link.

16. A computer program product comprising program code for performing a method according to claim 15, when the computer program runs on a computing device.

* * * * *